US008412146B2

(12) United States Patent
Mao

(10) Patent No.: US 8,412,146 B2
(45) Date of Patent: Apr. 2, 2013

(54) MUTUAL AWAKENING SYSTEM AND METHOD THEREOF BETWEEN A HANDHELD DEVICE AND A WIRELESS COMMUNICATION MODULE

(75) Inventor: Lihua Mao, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 832 days.

(21) Appl. No.: 12/554,626

(22) Filed: Sep. 4, 2009

(65) Prior Publication Data

US 2010/0058081 A1   Mar. 4, 2010

(30) Foreign Application Priority Data

Sep. 4, 2008   (TW) ............................... 97133945 A

(51) Int. Cl.
*H04B 1/16* (2006.01)

(52) U.S. Cl. .................. 455/343.2; 455/343.1; 455/418; 455/420; 455/572; 455/574; 455/557

(58) Field of Classification Search .................. 455/418, 455/420, 572, 574, 557, 500, 502, 343.1, 455/343.2, 343.5; 710/100, 104, 110, 313; 709/208, 209, 237
See application file for complete search history.

(56) References Cited

U.S. PATENT DOCUMENTS

| | | | |
|---|---|---|---|
| 6,308,278 B1 * | 10/2001 | Khouli et al. | 713/323 |
| 6,417,846 B1 * | 7/2002 | Lee | 345/173 |
| 6,785,556 B2 * | 8/2004 | Souissi | 455/557 |
| 6,804,541 B1 * | 10/2004 | Muramatsu et al. | 455/573 |
| 7,181,236 B1 * | 2/2007 | Truong et al. | 455/550.1 |
| 7,206,603 B2 * | 4/2007 | Shinohara | 455/557 |
| 7,502,635 B1 * | 3/2009 | Horikoshi et al. | 455/574 |
| 7,519,743 B2 * | 4/2009 | Yen | 710/14 |
| 2002/0183092 A1 * | 12/2002 | Suzuki et al. | 455/557 |
| 2008/0215765 A1 * | 9/2008 | Butler et al. | 710/15 |

* cited by examiner

*Primary Examiner* — Tuan A Tran
(74) *Attorney, Agent, or Firm* — Muncy, Geissler, Olds & Lowe, PLLC

(57) ABSTRACT

A mutual awakening system and method thereof between a handheld device and a wireless communication module are disclosed. The system and method are applicable to the case that the wireless communication module is inserted and electrically coupled to the handheld device. The system includes a communication control line and a host control line which are used for electrically coupling the handheld device and the wireless communication module. When the handheld device is to transmit data, a second voltage signal of the communication control line is raised in value, which triggers a communication interrupt routine of the wireless communication module to awaken the wireless communication module from a sleep state. When the wireless communication module is to transmit data, a first voltage signal of the host control line is raised in value, which triggers a host interrupt routine of the handheld device to awaken the handheld device from a sleep state.

10 Claims, 6 Drawing Sheets

MUTUAL AWAKENING SYSTEM AND METHOD THEREOF BETWEEN A HANDHELD DEVICE AND A WIRELESS COMMUNICATION MODULE

CROSS-REFERENCE TO RELATED APPLICATION

This application claims the benefit of Taiwan Patent Application No. 097133945, filed on Sep. 4, 2008, which is hereby incorporated by reference for all purposes as if fully set forth herein.

BACKGROUND OF THE INVENTION

1. Field of the Invention

The present invention relates to an awakening mechanism between a handheld device and a wireless communication module, and more particularly to a mutual awakening system and method thereof between a handheld device and a wireless communication module.

2. Description of the Prior Art

Referring to FIG. 1, which shows a block schematic view of an electrical coupling between a general wireless communication module 120 and a handheld device 110, wherein the handheld device 110 and the wireless communication module 120 are mutually electrically coupled through a bus 130 to enable data transmission therebetween.

Generally speaking, in order to achieve a power saving effect, the handheld device 110 itself is provided with a sleep mechanism, which enables the handheld device 110 to enter a sleep state when a user has not used the handheld device 110 for a long period of time. Moreover, the wireless communication module 120 is similarly provided with a sleep mechanism, which prevents the wireless communication module 120 from being unable to be awakened after entering a sleep state, or prevents the wireless communication module 120 from being in an awaken state for too long. Hence, the wireless communication module 120 is configured with a periodic sleep mechanism that repeatedly carries out a periodic self-awakening/sleep switching operation, and when self-awakening occurs, it is determined whether the handheld device 110 is transmitting data so as to execute the corresponding operational procedure.

However, the current running state of the handheld device 110 and the wireless communication module 120 in relation to one another cannot be detected. The handheld device 110 transmits data to the wireless communication module 120, but must wait for the wireless communication module 120 to self-awake before all the data is obtained. On the other hand, the wireless communication module 120 transmits data to the handheld device 110 to trigger an awake procedure or an interrupt instruction of the sleep mechanism.

However, the prior art has the following unavoidable shortcomings:

1. Regarding the handheld device 110, the transmitted data obtained from the wireless communication module 120 is used to trigger an awake procedure of the sleep mechanism, and regardless of the design of each manufacturer, the data transmission operation must wait for complete awakening of the handheld device 110 before proceeding, and is unable to immediately enter the operating state, thereby creating a senseless standby period for the user.

2. Regarding the wireless communication module, when the time the handheld device 110 is transmitting data is the time when the wireless communication module 120 is in a sleep state, and the transmission procedure must wait for the wireless communication module 120 to awaken before processing the transmitted data from the handheld device 110, which similarly creates a senseless standby period for the user.

SUMMARY OF THE INVENTION

In light of the above, and in order to resolve the aforementioned problems of the prior art, the present invention provides an awakening system and method thereof which enables rapid mutual awakening between a handheld device and a wireless communication module.

In order to resolve the aforementioned system problems, the present invention provides a mutual awakening system between a handheld device and a wireless communication module, which is applicable to the case that the wireless communication module is inserted into and electrically coupled to a handheld device. The system includes a handheld device, a wireless communication module, a communication control line and a host control line. The handheld device stores a host interrupt routine and a host detector module, and the host interrupt routine is for awakening the handheld device. The wireless communication module stores a communication interrupt routine and a communication detector module, and the communication interrupt routine is for awakening the wireless communication module. The host control line is electrically coupled to the handheld device and the wireless communication module, and the wireless communication module transmits a first voltage signal through the host control line. The communication control line is electrically coupled to the handheld device and the wireless communication module, and the handheld device transmits a second voltage signal through the communication control line. When the wireless communication module is placed in a sleep state and the communication detector module detects that the second voltage signal of the communication control line is in a high voltage state, the communication detector module actuates the communication interrupt routine to awaken the wireless communication module; and when the handheld device is placed in a sleep state and the host detector module detects that the first voltage signal of the host control line is in a high voltage state, the host detector module actuates the host interrupt routine to awaken the handheld device.

Furthermore, the present invention provides a method for a handheld device to awaken a wireless communication module, applicable to the case that the wireless communication module is inserted into and electrically coupled to the handheld device, with the wireless communication module placed in a sleep state, wherein a communication control line is electrically coupled between the handheld device and the wireless communication module. The method comprises the following steps: raising a voltage signal of the communication control line; the wireless communication module detecting variation in the voltage signal of the communication control line; and awakening the wireless communication module when the voltage signal is in a high voltage state.

Furthermore, the present invention provides a method for a wireless communication module to awaken a handheld device, applicable to the case that the wireless communication module is inserted into and electrically coupled to the handheld device, with the handheld device placed in a sleep state, wherein a host control line is electrically coupled between the handheld device and the wireless communication module. The method comprises the following steps: raising a voltage signal of the host control line; the wireless communication module detecting variation in the voltage signal of the host control line; and awakening the handheld device when the voltage signal is in a high voltage state.

The present invention provides the following efficacies that the prior art cannot achieve:

1. When the handheld device and the wireless communication module detect the variation in voltage signal of the related control line, an interrupt routine is executed for self-awakening to restore an awaken state from a sleep state. This can ensure that when data is being transmitted the respective module (the handheld device or the wireless communication module) is awakened, and the respective module is able to immediately carry out the relevant data operations, thereby improving operating efficiency of the handheld device and the wireless communication module.

2. Because hardware control lines are used to carry out detection and awakening operations, there is no need to wait for the wireless communication module to self-awake. Hence, the time it takes for the wireless communication module to enter an operating state is reduced, which further increases the entire operating efficiency.

3. When either the handheld device or the wireless communication module needs to operate, the other device can be enabled to continue in a sleep state, thereby achieving maximum power saving efficiency.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
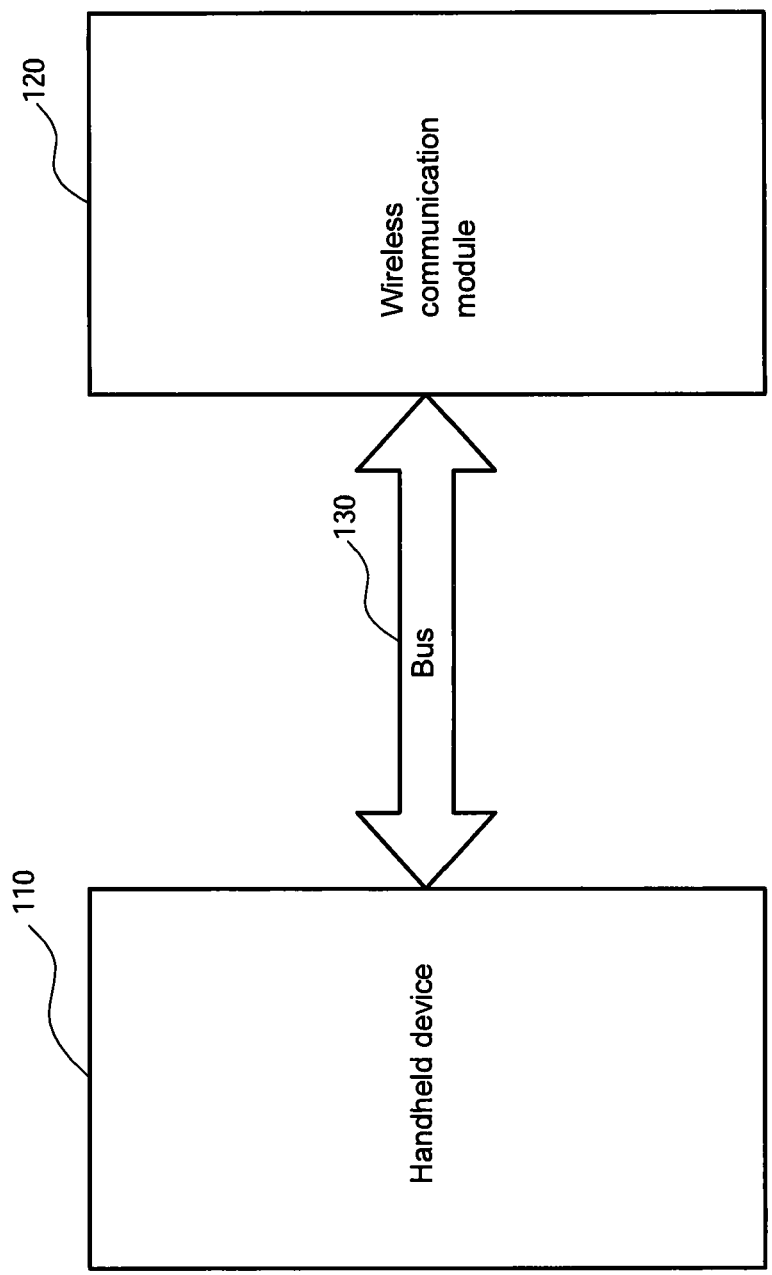
FIG. 1 is a block schematic view of a system of the prior art.
Figure 2:
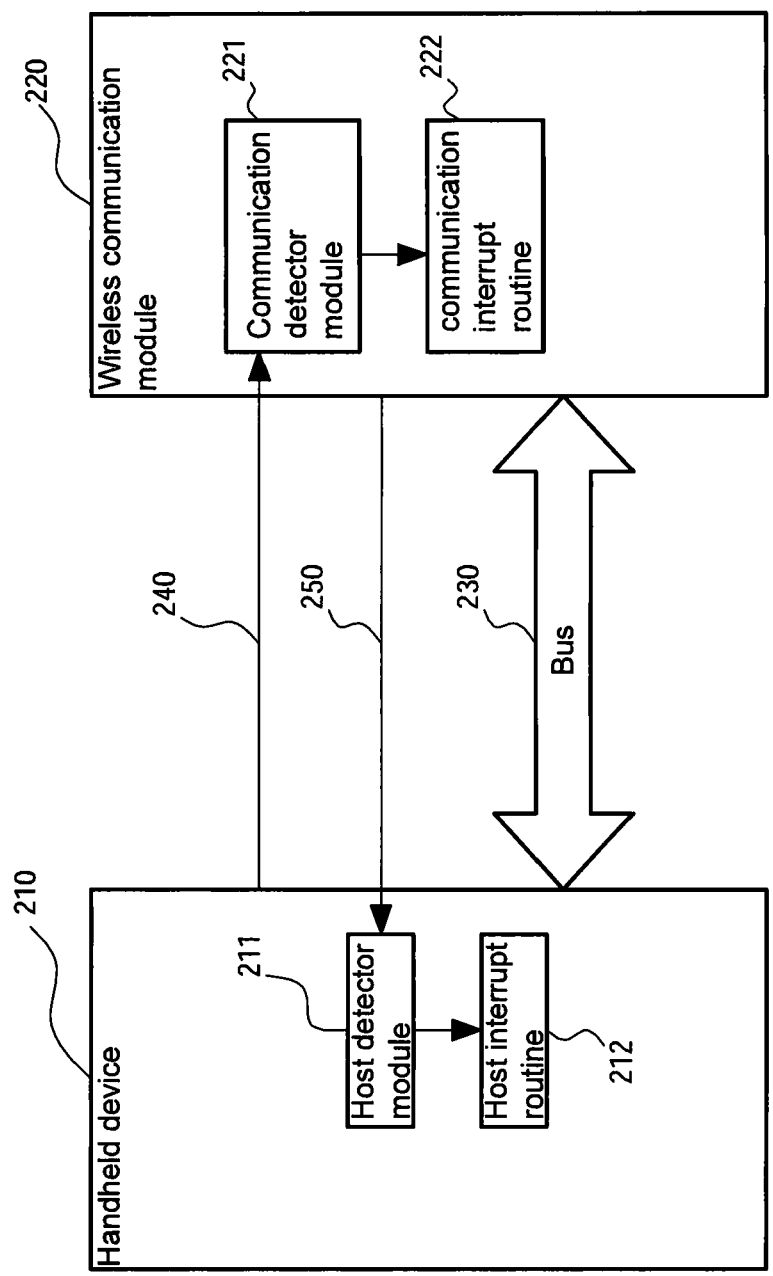
FIG. 2 is a block schematic view of an embodiment of a system of the present invention.

Referring to FIG. 2, which shows a block schematic view of an embodiment of the present invention, comprising a handheld device 210, a wireless communication module 220, a bus 230, a communication control line (Interrupt Module Line, INTM) 240 and a host control line (Interrupt Host Line, INTH) 250, wherein the wireless communication module 220 may be, for example, a wireless communication module card or it can be inserted into and electrically coupled to the handheld device 210.

The handheld device 210 stores a host interrupt routine 212 and a host detector module 211, and the host interrupt routine 212 is for awakening the handheld device 210. The wireless communication module 220 stores a communication interrupt routine 222 and a communication detector module 221, and the communication interrupt routine 222 is for awakening the wireless communication module 220. The bus 230, the communication control line (INTM) 240 and the host control line (INTH) 250 are respectively electrically coupled between the handheld device 210 and the wireless communication module 220. The bus 230 enables the handheld device 210 and the wireless communication module 220 to carry out data transmission operations when both are awakened.

The handheld device 210 is able to transmit or adjust the voltage signal of the communication control line (INTM) 240, and the communication detector module 221 detects variation in the voltage signal of the communication control line (INTM) 240. In this embodiment, the wireless communication module 220 transmits a first voltage signal through the host control line 250, and the handheld device 210 transmits a second voltage signal through the communication control line 240. When the wireless communication module 220 is placed in a sleep state and the communication detector module 240 detects that the second voltage signal of the communication control line 240 is in a high voltage state, the communication detector module actuates the communication interrupt routine 222 to awaken the wireless communication module 220; and when the handheld device 210 is placed in a sleep state and the host detector module detects that the first voltage signal of the host control line 250 is in a high voltage state, the host detector module 211 actuates the host interrupt routine 212 to awaken the handheld device 210.

If the handheld device 210 lowers the second voltage signal of the communication control line 240, the communication detector module detects that the second voltage signal of the communication control line 240 has dropped to a low voltage state, then the communication interrupt routine 222 is suspended. After the communication interrupt routine 222 is suspended, the wireless communication module 220 enters a sleep state.

In addition, the low voltage state of the second voltage signal refers to a voltage value to which the second voltage signal has dropped from a high voltage value, and that the second voltage signal remains at the voltage value. The voltage value of the second voltage signal is, for example, 0 volts.

If the wireless communication module 220 lowers the first voltage signal of the host control line 250, the host detector module 211 detects that the first voltage signal of the host control line 250 has dropped to a low voltage state, then the host interrupt routine 212 is suspended. After the host interrupt routine 212 is suspended, the handheld device 210 enters a sleep state.

In addition, the high voltage state of the first voltage signal refers to a voltage value to which the voltage signal has risen from a low voltage value, and that the voltage signal remains at the voltage value.

Figure 3:
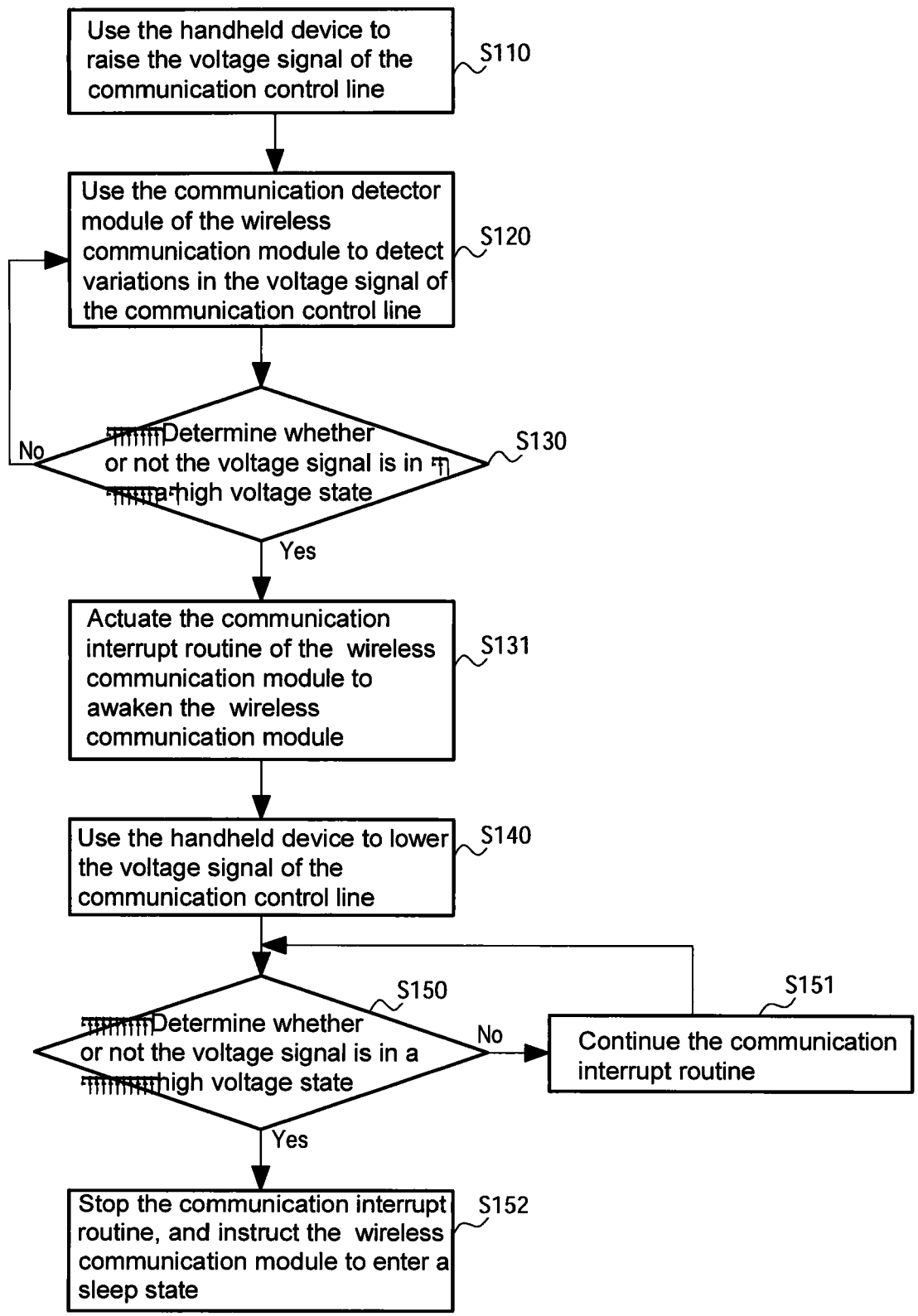
FIG. 3 is a flow chart for a method for a handheld device to awaken a wireless communication module according to the embodiment of the present invention.

Referring to FIG. 3, it shows a flow chart for a method for the handheld device 210 to awaken the wireless communication module 220 according to the embodiment of the present invention. At the same time also refer to the block structural view depicted in FIG. 2 and a clock graph depicted in FIG. 4 to facilitate understanding. In this embodiment, the wireless communication module 220 is inserted into and electrically coupled to the handheld device 210, with the wireless communication module 220 placed in a sleep state, wherein a communication control line 240 is electrically coupled between the handheld device 210 and the wireless communication module 220. Generally speaking, the bus 230 is provided with four data control transmission control lines, including TxD (Transmit Data), RxD (Receive Data), RTS (Request to Send) and CTS (Clear to Send). However, hereinafter only the two control lines TxD and RxD are taken to exemplify and describe the way to carry out data transmission.

Figure 4:
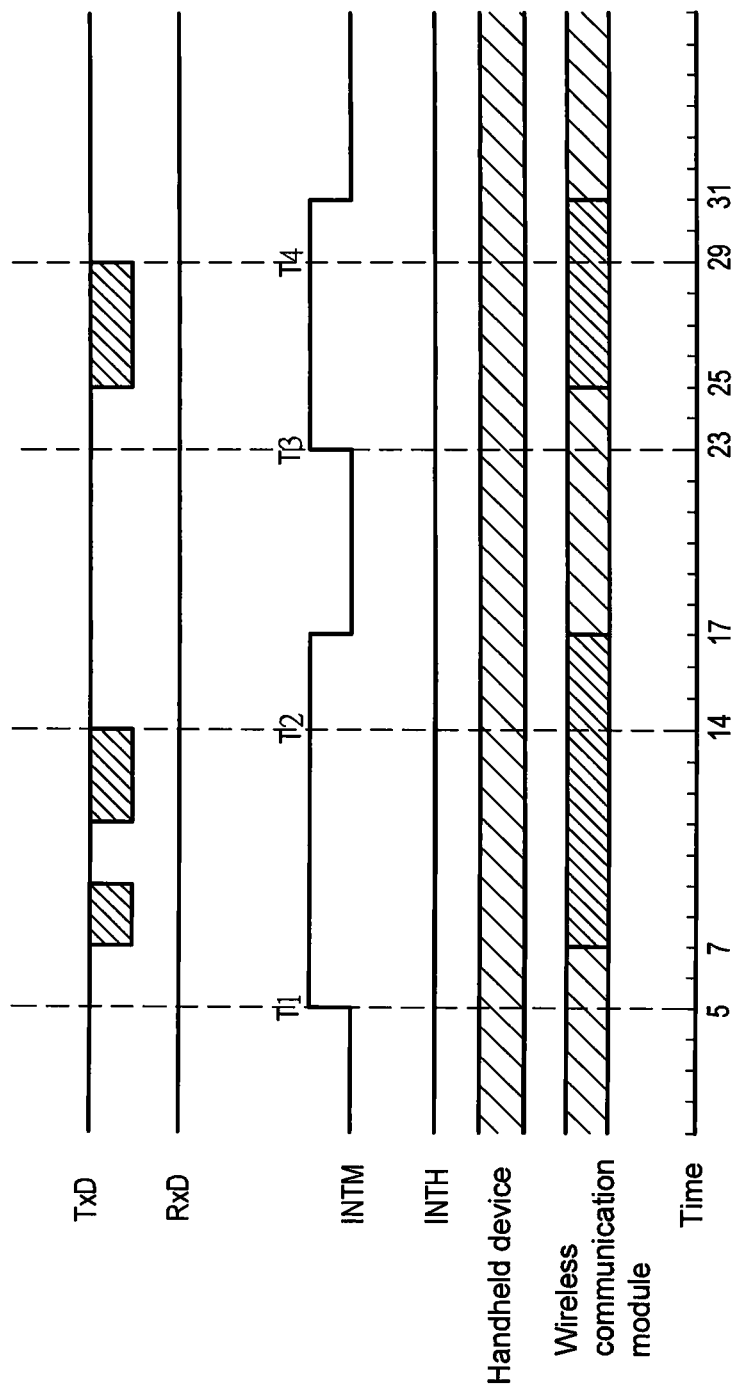
FIG. 4 is a clock graph for the handheld device awakening the wireless communication module according to the embodiment of the present invention.

The handheld device 210 is used to raise the second voltage signal of the communication control line (INTM) 240 (step S110). Referring to FIG. 4, when the handheld device 210 is intended to transmit data, the second voltage signal of the communication control line 240 (INTM) is first raised at the fifth time unit. However, because the handheld device 210 continues operating and remains at an operating state, the handheld device 210 will not change its state and enter a sleep state.

The communication detector module 221 of the wireless communication module 220 is used to detect variation in the second voltage signal of the communication control line (INTM) 240 (step S120). If the handheld device 210 raises the second voltage signal of the communication control line (INTM) 240, the communication detector module 221 immediately detects a change in the second voltage signal of the communication control line (INTM) 240, after which it is determined whether the second voltage signal is in a high voltage state (step S130).

The so-called high voltage state refers to a voltage state higher than the starting value of the second voltage signal of the communication control line (INTM) 240 and which exceeds a specific value. For instance, if the starting value of the second voltage signal is 0 volts, then when in a high voltage state, the second voltage signal is raised to one of a plurality of voltage value specifications most often used, including 3 volts, 5 volts, 6 volts, 9 volts, 10 volts and 12 volts, but is not limited to these voltage values.

If it is determined that the second voltage signal is in a high voltage state, the communication interrupt routine 222 of the wireless communication module 220 is actuated to awaken the wireless communication module 220 (step S131). Referring to FIG. 4, the communication interrupt routine 222 is actuated at the fifth time unit, and the wireless communication module 220 is completely awakened at the seventh time unit, whereupon the wireless communication module 220 remains at an awaken state, and at which time the handheld device 210 transmits data to the wireless communication module 220 through the transmit data (TxD) line.

Otherwise, if it is determined that the second voltage signal is not in a high voltage state, the communication detector module 221 of the wireless communication module 220 continues to detect variation in the second voltage signal of the communication control line (INTM) 240 (step S120). Because there is a likelihood of the operations of components of the handheld device 210 causing a change in the second voltage signal of the communication control line (INTM) 240, rather than that the handheld device 210 intends to transmit data, this high voltage state detection step prevents the wireless communication module 220 from being awakened at wrong time.

After data is transmitted, the handheld device 210 is used to lower the second voltage signal of the communication control line (INTM) 240 (step S140). As depicted in FIG. 4, the handheld device 210 completes the data transmission operation at the fourteenth time unit, and determines that data is no longer being transmitted, and then the second voltage signal of the communication control line 240 (INTM) drops at the seventeenth time unit.

It is then determined whether the second voltage signal is in a high voltage state (step S150). The communication detector module 221 determines whether to continue the communication interrupt routine 222 according to whether the second voltage signal remains at a high voltage state, to prevent the wireless communication module 220 from entering a sleep state.

If the communication detector module 221 determines that the second voltage signal is in a high voltage state, this represents that the handheld device 210 is continuing to transmit data, or the handheld device 210 has started lowering the second voltage signal, and the second voltage signal has not yet returned to the starting value, then the communication interrupt routine 222 is continued (step S151), and the communication detector module 221 continues to determine whether the second voltage signal remains at a high voltage state (step S150). Otherwise, the communication interrupt routine 222 is suspended, and the wireless communication module 220 enters a sleep state (step S152).

Figure 5:
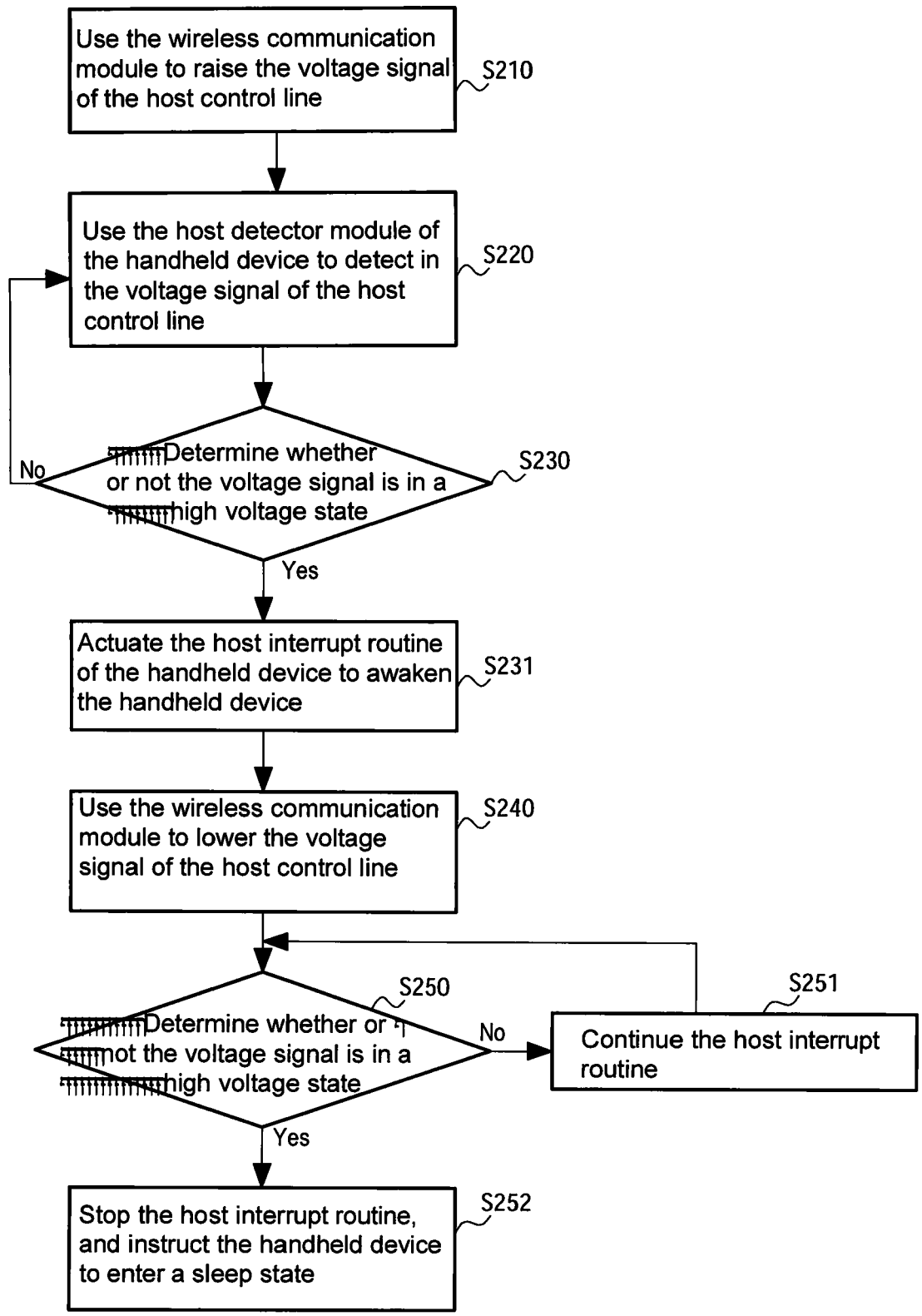
FIG. 5 is a flow chart for a method for the handheld device to awaken the wireless communication module according to an embodiment of the present invention.

Referring to FIG. 5, it shows a flow chart for a method for the handheld device 210 to awaken the wireless communication module 220 according to the embodiment of the present invention. At the same time also refer to the block structural view depicted in FIG. 2 and the clock graph depicted in FIG. 4 to facilitate understanding. In this embodiment, the wireless communication module 220 is inserted into and electrically coupled to the handheld device 210, with the handheld device placed in a sleep state. The differences between FIG. 5 and both FIG. 3 and FIG. 4 lie in the condition that the wireless communication module 220 is used to adjust the first voltage signal of the host control line (INTH) 250, and the receive data (RxD) line is used to transmit data.

Figure 6:
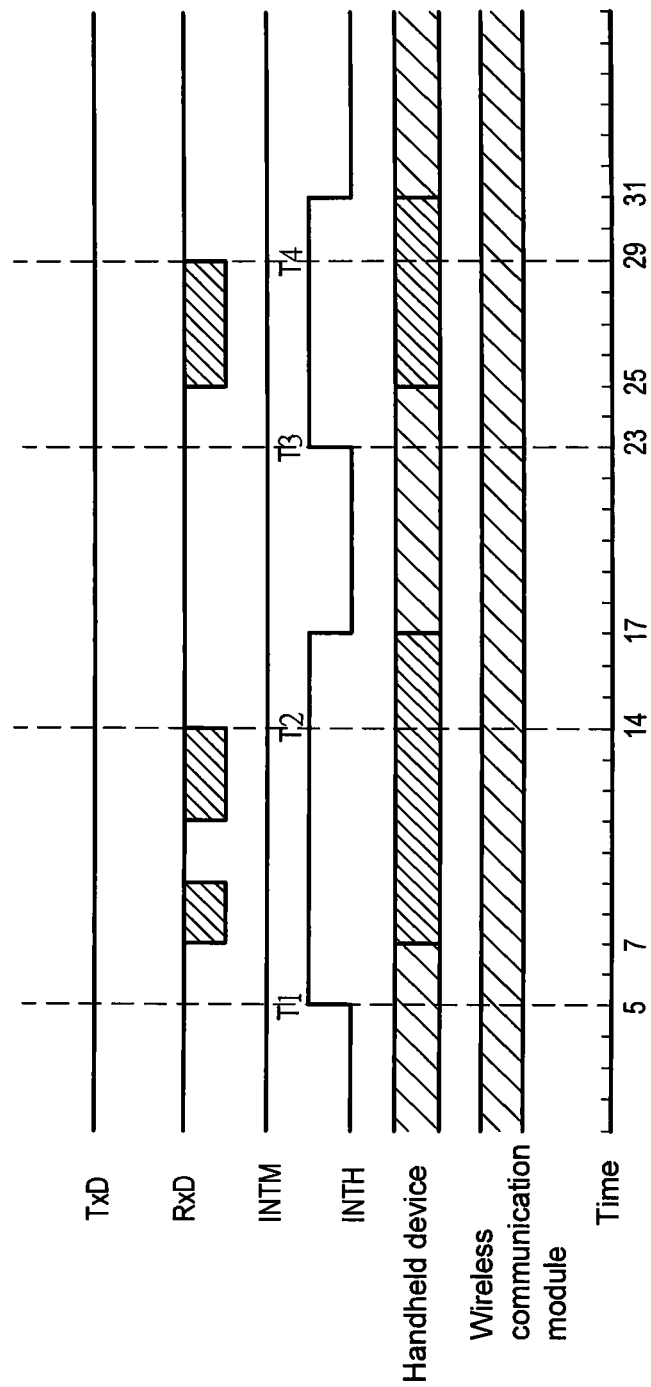
FIG. 6 is a clock graph for the handheld device awakening the wireless communication module according to the embodiment of the present invention.

The wireless communication module 220 is used to raise the first voltage signal of the host control line (INTH) 250 (step S210). Referring to FIG. 6, when the wireless communication module 220 is intended to transmit data, the first voltage signal of the host control line (INTH) 250 is first raised at the fifth time unit. However, because the wireless communication module 220 continues to operate and remains at an operating state, the wireless communication module 220 will not change its state and enter a sleep state.

The host detector module 211 of the handheld device 210 is used to detect variation in the first voltage signal of the host control line (INTH) 250 (step S220). If the wireless communication module 220 raises the first voltage signal of the host control line (INTH) 250, the host detector module 211 immediately detects a change in the first voltage signal of the host control line (INTH) 250, whereupon it is determined whether the first voltage signal is in a high voltage state (step S230).

If it is determined that the first voltage signal is in a high voltage state, the host interrupt routine 212 of the handheld device 210 is actuated to awaken the handheld device 210 (step S231). Referring to FIG. 6, the host interrupt routine 212 is actuated at the fifth time unit, and the handheld device 210 is completely awakened at the seventh time unit, and the host interrupt routine 212 continues to enable the handheld device 210 to remain at an awaken state, at which time the wireless communication module 220 transmits data to the handheld device 210 through the receive data (RxD) line.

Otherwise, if it is determined that the first voltage signal is not in a high voltage state, the host detector module 211 of the handheld device 210 continues to detect variation in the first voltage signal of the host control line (INTH) 250 (step S220). Because there is a likelihood of the operations of components of the wireless communication module 220 causing a change in the first voltage signal of the host control line (INTH) 250, this high voltage state detection step prevents the handheld device 210 from being awakened at wrong time.

After completing data transmission, the wireless communication module 220 is used to lower the first voltage signal of the host control line (INTH) 250 (step S240). Referring to FIG. 6, the wireless communication module 220 completes the data transmission operation at the fourteenth time unit, and determines that data is no longer being transmitted, and then the wireless communication module 220 lowers the first voltage signal of the host control line (INTH) 250 at the seventeenth time unit.

It is then determined whether the first voltage signal is in a high voltage state (step S250). The host detector module 211 determines whether to continue the host interrupt routine 212 according to whether the first voltage signal remains at a high voltage state.

If it is determined that the first voltage signal is in a high voltage state, this represents that the wireless communication module 220 is continuing to transmit data, or the wireless communication module 220 has started lowering the first voltage signal, and the first voltage signal has not yet returned to the starting value, then the host interrupt routine 212 is continued (step S251), and the host detector module 211 continues to determine whether the first voltage signal remains at a high voltage state (step S250). Otherwise, the host interrupt routine 212 is suspended, and the handheld device 210 is caused to enter a sleep state (step S252).

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A mutual awakening system between a handheld device and a wireless communication module, applicable to the case that the wireless communication module is inserted into and electrically coupled to the handheld device, comprising:
    a handheld device storing a host interrupt routine and a host detector module, and the host interrupt routine for awakening the handheld device;
    a wireless communication module storing a communication interrupt routine and a communication detector module, and the communication interrupt routine for awakening the wireless communication module;
    a host control line, electrically coupled to the handheld device and the wireless communication module, and wherein the wireless communication module transmits a first voltage signal through the host control line; and
    a communication control line, electrically coupled to the handheld device and the wireless communication module, and wherein the handheld device transmits a second voltage signal through the communication control line;
    wherein, when the wireless communication module is placed in a sleep state and the communication detector module detects that the second voltage signal of the communication control line is in a high voltage state, the communication detector module actuates the communication interrupt routine to awaken the wireless communication module; and when the handheld device is placed in a sleep state and the host detector module detects that the first voltage signal of the host control line is in a high voltage state, the host detector module actuates the host interrupt routine to awaken the handheld device;
    wherein if the wireless communication module lowers the first voltage signal of the host control line, the host detector module detects that the first voltage signal of the host control line has dropped to a low voltage state, and suspends the host interrupt routine.

2. The mutual awakening system between a handheld device and a wireless communication module according to claim 1, wherein if the handheld device lowers the second voltage signal of the communication control line, the communication detector module detects that the second voltage signal of the communication control line has dropped to a low voltage state, and suspends the communication interrupt routine.

3. The mutual awakening system between a handheld device and a wireless communication module according to claim 2, wherein after the communication interrupt routine is suspended, the wireless communication module enters a sleep state.

4. The mutual awakening system between a handheld device and a wireless communication module according to claim 2, wherein the low voltage state of the second voltage signal refers to a voltage value to which the second voltage signal has dropped from a high voltage value, and the second voltage signal remains at the voltage value.

5. The mutual awakening system between a handheld device and a wireless communication module according to claim 4, wherein when the second voltage signal is in the low voltage state, the voltage value of the second voltage signal is 0 volts.

6. The mutual awakening system between a handheld device and a wireless communication module according to claim 1, wherein after the host interrupt routine is suspended, the handheld device enters a sleep state.

7. The mutual awakening system between a handheld device and a wireless communication module according to claim 1, wherein the high voltage state of the first voltage signal refers to a voltage value to which the first voltage signal has risen from a low voltage value, and that the first voltage signal remains at the voltage value.

8. A method for a wireless communication module to awaken a handheld device, applicable to the case that the wireless communication module is inserted into and electrically coupled to the handheld device, with the handheld device placed in a sleep state, wherein a host control line is electrically coupled between the handheld device and the wireless communication module, and the method comprises the following steps:
    raising a voltage signal of the host control line;
    the wireless communication module detecting variation in the voltage signal of the host control line;
    awakening the handheld device when the voltage signal is in a high voltage state; and
    stopping awakening the handheld device when detecting that the wireless communication module has lowered the voltage signal of the host control line.

9. The method for a wireless communication module to awaken a handheld device according to claim 8, further comprising a step of the handheld device entering a sleep state.

10. The method for a wireless communication module to awaken a handheld device according to claim 8, wherein the high voltage state of the voltage signal refers to a voltage value to which the voltage signal has risen from a low voltage value, and the voltage signal remains at the voltage value.

* * * * *